US006967321B2

(12) United States Patent
Leong et al.

(10) Patent No.: US 6,967,321 B2
(45) Date of Patent: Nov. 22, 2005

(54) OPTICAL NAVIGATION SENSOR WITH INTEGRATED LENS

(75) Inventors: Ak Wing Leong, Penang (MY); Gurbir Singh, Penang (MY); Poh Huat Lye, Penang (MY); Sai Mun Lee, Penang (MY)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/286,252

(22) Filed: Nov. 1, 2002

(65) Prior Publication Data

US 2004/0084610 A1 May 6, 2004

(51) Int. Cl.[7] .............................................. H01J 40/14

(52) U.S. Cl. ...................................... 250/239; 345/166

(58) Field of Search ............................... 250/221, 234, 250/239; 345/163, 166

(56) References Cited

U.S. PATENT DOCUMENTS 6,541,762 B2 * 4/2003 Kang et al. ................. 250/239
2003/0142075 A1 7/2003 Chin

* cited by examiner

*Primary Examiner*—Thanh X. Luu

(57) ABSTRACT

An optical navigation sensor apparatus for an optical mouse includes an optical navigation sensor having an electronic chip, an aperture plate and an imaging lens integrated into a single package. The imaging lens includes a lens housing surrounding the aperture and providing a barrier to the entry of foreign matter into the aperture. In one form, the optical navigation sensor also includes a light emitting diode (LED) for illuminating a small area of a surface under the sensor and generating a reflected image that is detected by the electronic chip. In a sensor having an integral LED, an integral collimating lens is included for receiving light from the LED and focusing the light from the LED on the surface to be illuminated. The collimating lens is incorporated into a lens housing surrounding the LED and protecting the LED from exposure to foreign material.

2 Claims, 4 Drawing Sheets

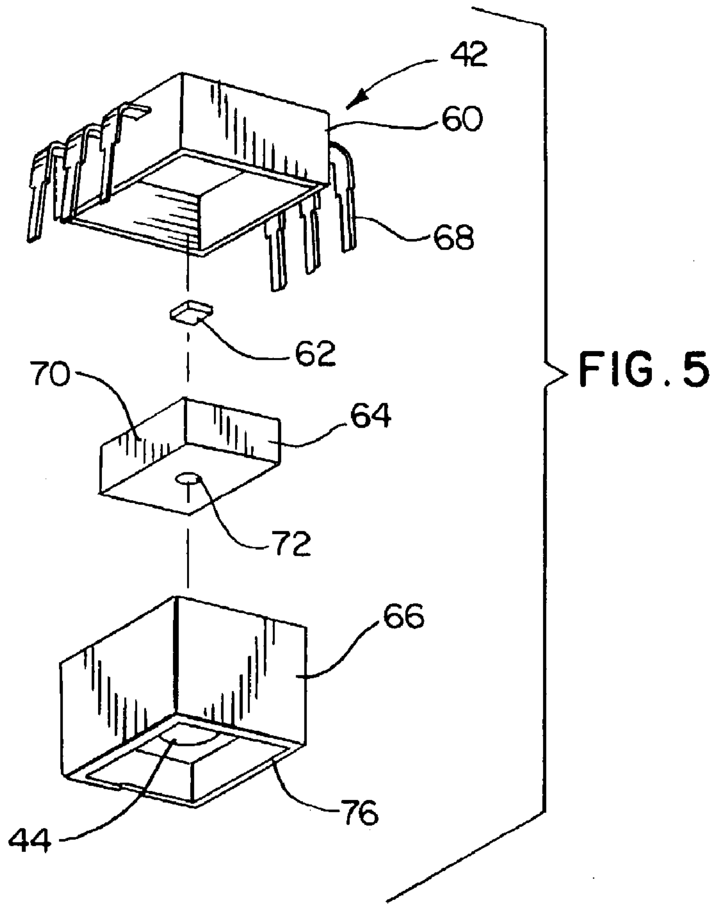
FIG. 5
FIG. 6
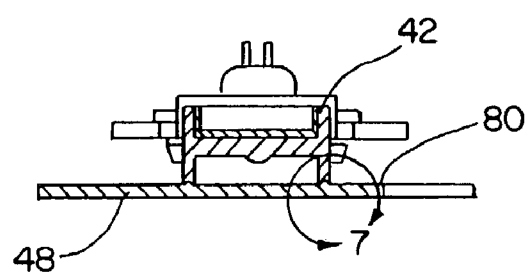
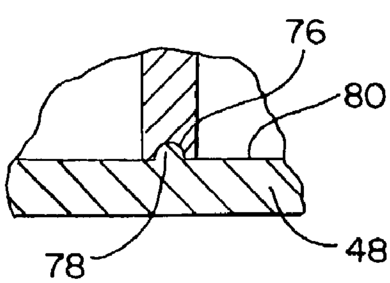
FIG. 7

OPTICAL NAVIGATION SENSOR WITH INTEGRATED LENS

TECHNICAL FIELD OF THE INVENTION

This invention relates an optical navigation sensor apparatus, and more particularly to an optical navigation sensor that is particularly well suited for use in an optical navigation sensor apparatus of an optical computer mouse.

BACKGROUND OF THE INVENTION

An optical computer mouse typically includes an optical navigation sensor apparatus, having a number of separate components, including an electronic chip that functions as a miniature digital camera to continually record images of a surface that the mouse is resting upon, and determine the speed and direction that the mouse is being moved across the surface by comparing sequentially recorded images of the surface. The images are recorded at a very high rate, such as 1500 images per second, and the resolution of the sensor is high, so that very small movements of the mouse can be detected.

The optical navigation sensor apparatus typically includes a light source, in the form of a light emitting diode (LED), for illuminating a small area of the surface that the mouse is resting upon, and generating a reflected image of the illuminated small area that is sensed and recorded by the electronic chip. The optical navigation sensor apparatus typically also includes one or more lenses or light pipes, for conducting and focusing the light from the LED on the small area of the surface, and for receiving the reflected image and focusing it on the electronic chip. The optical sensor navigation apparatus typically further includes an aperture plate that allows the reflected image to pass through the aperture and impinge on the electronic chip, while blocking spurious light from reaching the electronic chip.

As shown in FIGS. 1 and 2, in a typical prior optical navigation sensor apparatus 10, the electronic chip 12 and the aperture plate 14 are attached to a sensor housing 16, to form an optical navigation sensor 18. The aperture plate 14 includes an aperture, in the form of a hole 20, extending through the aperture plate 14. The sensor 18 is attached with a clip 22 to an electrical circuit board 24 mounted on a base plate 26 of an optical computer mouse 28. An LED 30 is also mounted on the circuit board 24, and a lens/light pipe 32 is positioned between the sensor 18, LED 30, and base plate 26, to direct light from the LED 30, through a hole 34 in the base plate 26, onto a small area of the surface 36 that the mouse 28 is resting upon, and to direct a reflected image of the small area of the surface 36 through the hole 20 in the aperture plate 14 to the electronic chip 12.

In order to protect the electronic chip 12 from exposure to foreign matter that could damage the chip 12, and to prevent dust particles that could interfere with operation of the chip 12 from entering the sensor 18 through the hole 20 in the aperture plate 14, a small piece of Kapton® tape 38 is glued over the hole 20. This piece of tape 38 must be removed at a proper point during assembly of the mouse 28, for the optical navigation sensor apparatus 10 to operate correctly. It is desirable that the piece of tape 38 remain in place until all soldering operations required to join the sensor 18 and LED 30 to the circuit board 24 have been completed, to prevent vapors and contamination generated in the soldering process from entering the sensor 18.

When the tape 38 is removed, it is necessary that the lens/light pipe 32 immediately be joined to the sensor 18, so that the lens/light pipe 32 can cover the hole 20 in the aperture plate 14 and prevent floating dust from entering the sensor 18. Dust in the sensor 18 can cause intermittent failures of the sensor 18, as the dust moves around inside the sensor 18 and interferes with transmission of the reflected image to the electronic chip 12. Special care must also be exercised to ensure that the piece of tape 38 does not come loose during any soldering operations, and that the entire piece of tape 38 is removed, prior to joining the lens/light pipe 32 to the sensor 18.

SUMMARY OF THE INVENTION

The invention provides an improved optical navigation sensor apparatus through use of an optical navigation sensor having the electronic chip, an aperture plate, and an imaging lens, integrated into a single package.

In one form of the invention, an optical navigation sensor includes a sensor housing, an electronic chip in the form of a die, an aperture housing, and an imaging lens. The die is attached to the sensor housing. The aperture housing is attached to the sensor housing, surrounding the die for blocking stray light from reaching the die, and includes an aperture for receiving an image from an imaging lens and allowing passage of the image through the aperture to the die. The imaging lens is attached to the sensor housing for receiving an image and focusing the image on the die. In some forms of the invention, the imaging lens includes a lens housing surrounding the aperture and providing a barrier to the entry of foreign matter into the aperture.

According to one aspect of the invention, the sensor housing is a lead frame. In some forms of the invention the sensor housing is an insert molded lead frame.

In some forms of the invention, the image is a reflected image of a surface, and the optical sensor further includes a light emitting diode (LED) for illuminating the surface and generating the reflected image. According to one aspect of the invention, the optical sensor apparatus further includes a collimating lens for receiving light from the LED and focusing the light from the LED on the surface to be illuminated.

In some forms of the invention, the LED is mounted on the sensor housing. According to one aspect of the invention, the collimating lens includes a lens housing surrounding the LED and protecting the LED from exposure to foreign material. According to another aspect of the invention, the imaging lens and the collimating lens are disposed in a single lens housing.

According to a further aspect of the invention, the optical sensor is adapted for mounting on a mounting surface having an optical sensor locating feature, and the optical sensor includes a mating locating feature adapted for engaging the sensor locating feature of the mounting surface. Where the optical sensor is an optical navigation sensor of a computer mouse, a base plate of the mouse defines the mounting surface for the optical sensor.

In another form of the invention, an optical navigation computer mouse, includes a base plate, and an optical sensor apparatus operatively attached to the base plate includes an optical sensor as described in the summary above.

Another aspect of the invention provides a method for fabricating an optical navigation apparatus, including an optical sensor of the type described in the summary above.

An optical navigation sensor apparatus according to the invention provides a number of advantages over prior devices, including: elimination of the need for covering the hole in the aperture plate with the piece of tape; a significant reduction in the number of individual component parts that must be handled; and automatically alignment some or all of the components of the optical navigation apparatus in a proper orientation to optimize generation and capture of the reflected image.

The foregoing and other features and advantages of the invention are apparent from the following detailed description of exemplary embodiments, read in conjunction with the accompanying drawing. The detailed description and drawing are merely illustrative of the invention rather than limiting, the scope of the invention being defined by the appended claims and equivalents thereof.

BRIEF DESCRIPTION OF THE DRAWINGS

FIG. 5 is an exploded perspective illustration of the optical sensor of FIGS. 3 and 4;

FIGS. 6 and 7 are enlarged cross sections of an optical sensor and a mounting surface having complimentary locating features for orienting the optical sensor on the mounting surface.

DETAILED DESCRIPTION OF THE PRESENTLY PREFERRED EMBODIMENTS

Figure 1:
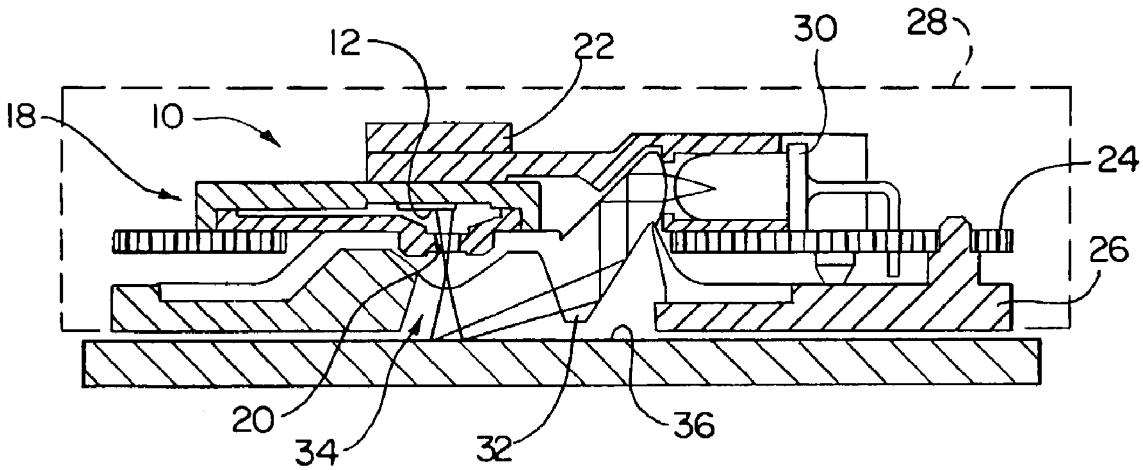
FIG. 1 is a schematic illustration of a prior optical navigation sensor apparatus in an optical mouse.
Figure 2:
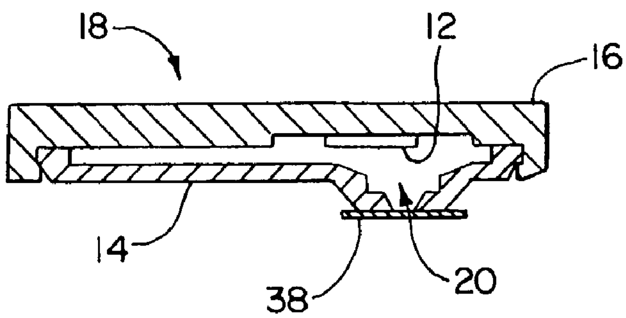
FIG. 2 is a schematic representation of a prior optical navigation sensor of the type used in the optical navigation sensor apparatus shown in FIG. 1.
Figure 3:
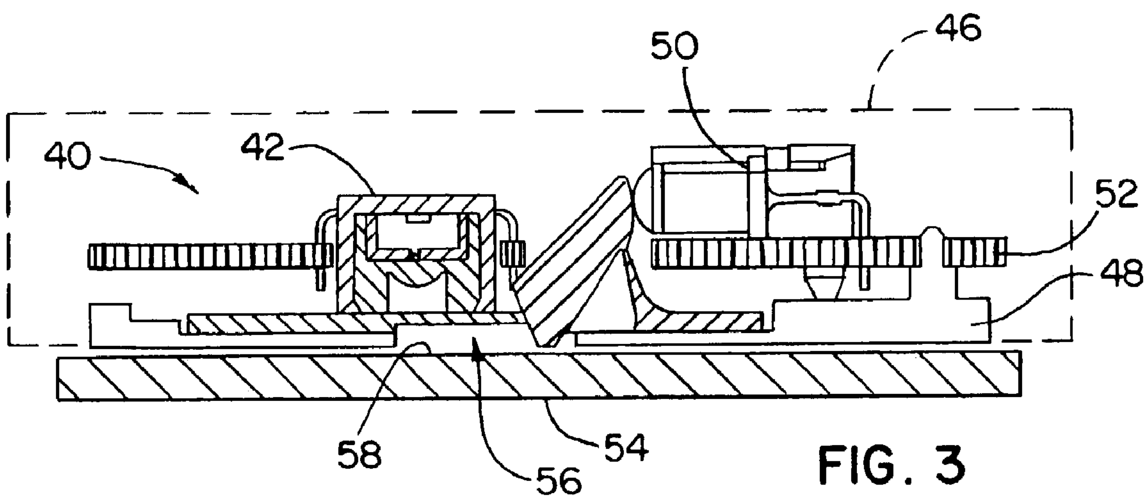
FIGS. 3 and 4 are schematic cross sections of a first embodiment of an optical sensor apparatus including an optical sensor having an integral imaging lens, according to the invention, in an optical computer mouse.
Figure 4:
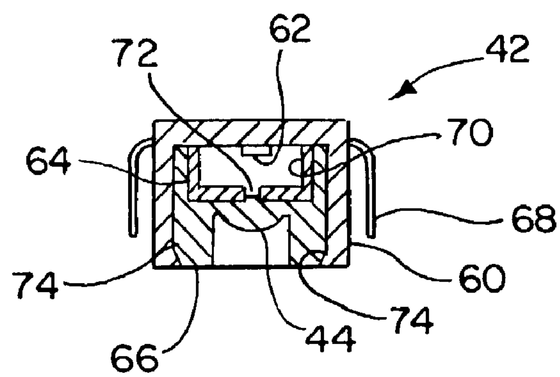

FIGS. 3, 4 and 5 show a first exemplary embodiment of an optical navigation sensor apparatus 40 including an optical sensor 42 having an integral imaging lens 44, according to the invention, in an optical computer mouse 46. The optical navigation sensor apparatus 40 is operatively attached, in a manner described in greater detail below, to a base plate 48 of the optical mouse 46.

The optical sensor navigation apparatus 40 of the first exemplary embodiment includes the optical navigation sensor 42, and an LED 50 operatively connected to a circuit board 52 mounted on the base plate 48, and a collimating lens 54 for directing light from the LED 50 through a hole 56 in the base plate 48 to illuminate a small area of a surface 58 beneath the base plate 48.

The optical navigation sensor 42 includes a sensor housing 60, an electrical chip in the form of a die 62, an aperture housing 64, and an imaging lens housing 66. The sensor housing 60 is an insert molded lead frame, having a series of contacts 68 for electrically connecting the lead frame to the circuit board 52. The die 62 is attached to the lead frame of the sensor housing 60 by surface mounting, wire bonding, or any other suitable connection method.

The aperture housing 64 is generally cup shaped and includes a skirt 70 that contacts the sensor housing 64 and surrounds the die 62 for blocking stray light from reaching the die 62. The closed end of the aperture housing 64 includes an aperture 72 for receiving an image from the imaging lens 44 and allowing passage of the image through the aperture 72 to the die 62.

The imaging lens 44 is formed integrally with the lens housing 66, and surrounds the aperture housing 64, to provide a barrier to the entry of foreign matter into the aperture 72. The sensor housing 60 and lens housing 66 include complimentary snap action features, as indicated at 74, for conveniently securing the lens housing 66 and aperture housing 64 to the sensor housing 60. The sensor housing 60, aperture housing 64 and lens housing 66 are all generally rectangular in shape and include mating surfaces that serve to automatically positioning the housings 60, 64, 66, and properly aligning the die 62, the imaging lens 44, and aperture 72, during assembly of the sensor 42.

The lower end of the optical sensor 42 is mounted directly upon on the base plate 48. As shown in FIGS. 5, 6 and 7, in some embodiments of the invention, the lower end of the optical sensor 42 includes a groove 76 adapted to engage an optical sensor locating feature, in the form of a ridge 78, extending upward from a mounting surface 80 of the base plate 48. The groove 76 thereby forms a mating locating feature adapted for engaging the sensor-locating feature of the mounting surface of the base plate 48.

Figure 8:
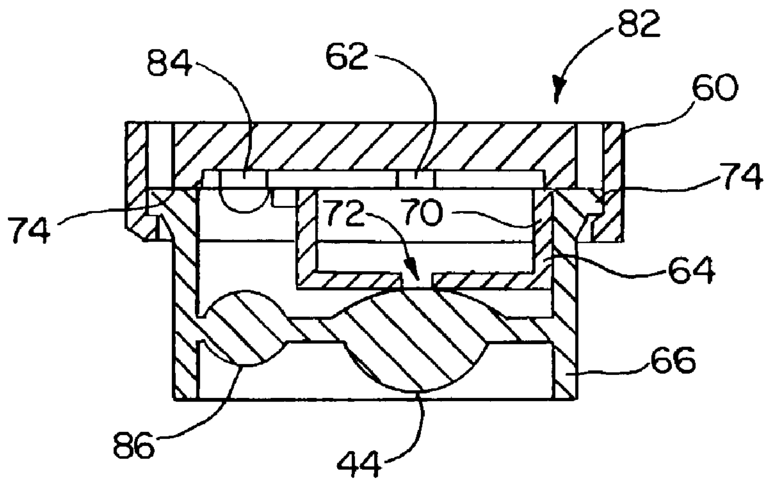
FIGS. 8 and 9 are an enlarged cross section and an exploded perspective illustration, respectively, of a second exemplary embodiment of an optical sensor according to the invention, having an integral LED and a combined imaging and collimating lenses in a single lens housing.
Figure 9:
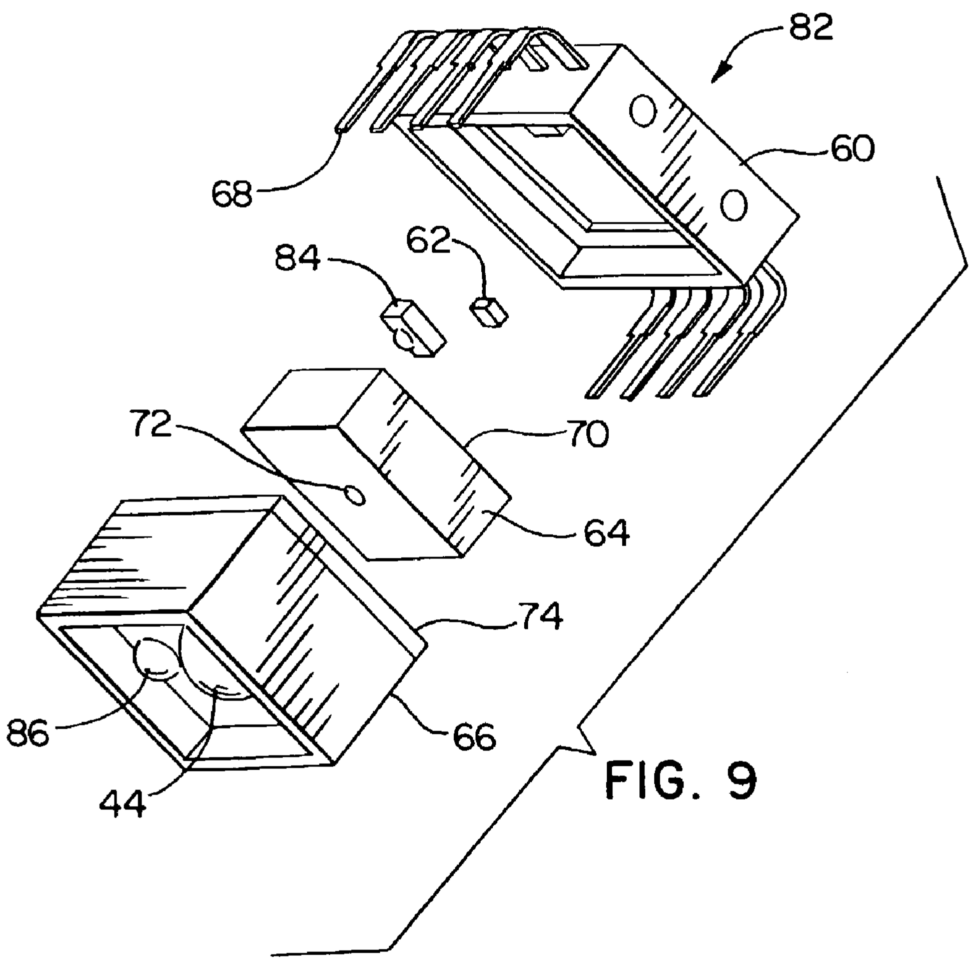

FIGS. 8 and 9 illustrate a second exemplary embodiment of an optical navigation sensor 82, according to the invention. The second exemplary embodiment of an optical navigation sensor 82 is identical in many respects to the first embodiment of the optical navigation sensor 42 described above, with the primary difference between the two being that in the second exemplary embodiment the LED and the collimating lens are incorporated into the optical navigation sensor 82. In the following description of the second exemplary embodiment, like reference numbers will be used in referring to components and features having significant similarity to the previously described components and features of the first exemplary embodiment.

The optical navigation sensor 82 includes a sensor housing 60, an electrical chip in the form of a die 62, an LED chip 84, an aperture housing 64, and an imaging lens housing 66. The sensor housing 60 is an insert molded lead frame, having a series of contacts 68 for electrically connecting the lead frame to a circuit board. The die 62 and LED chip 84 are attached to the lead frame of the sensor housing 60 by surface mounting, wire bonding, or any other suitable connection method.

The aperture housing 64 is generally cup shaped and includes a skirt 70 that contacts the sensor housing 64 and surrounds the die 62 for blocking stray light from reaching the die 62. The closed end of the aperture housing 64 includes an aperture 72 for receiving an image from the imaging lens 44 and allowing passage of the image through the aperture 72 to the die 62.

An imaging lens 44 and a collimating lens 86 are formed integrally with the lens housing 66. The lens housing 66 surrounds the aperture housing 64, to provide a barrier to the entry of foreign matter into the aperture 72. The sensor housing 60 and lens housing 66 include complimentary snap action features, as indicated at 74, for conveniently securing the lens housing 66 and aperture housing 64 to the sensor housing 60. The sensor housing 60, aperture housing 64 and lens housing 66 are all generally rectangular in shape and include mating surfaces that serve to automatically positioning the housings 60, 64, 66, and properly align the die 62 and LED chip 84 with the imaging and collimating lenses 44, 86, and the aperture 72, during assembly of the sensor 82. The lower end of the optical sensor 82 is adapted to be mounted directly upon on a base plate of an optical computer mouse.

While the embodiments of the invention disclosed herein are presently considered to be preferred, various changes and modifications can be made without departing from the spirit and scope of the invention. The various elements and aspects of the invention may be used independently from one another, or in different combinations than are described above and in the drawings with regard to the exemplary embodiment.

The scope of the invention is indicated in the appended claims. It is intended that all changes or modifications within the meaning and range of equivalents are embraced by the claims.

We claim:

1. An optical navigation sensor apparatus, comprising:

an optical navigation sensor including:

a sensor housing;

a die attached to the sensor housing;

an aperture housing attached to the sensor housing, surrounding the die for blocking stray light from reaching the die, and having an aperture for receiving an image from an imaging lens and allowing passage of the image through the aperture the die;

the imaging lens integrated with a lens housing, the lens housing secured within the sensor housing, the imaging lens adapted to receive the image and focus the image on the die; and wherein the sensor housing is a lead frame.

2. An optical navigation sensor apparatus, comprising:

an optical navigation sensor including:

a sensor housing;

a die attached to the sensor housing;

an aperture housing attached to the sensor housing, surrounding the die for blocking stray light from reaching the die, and having an aperture for receiving an image from an imaging lens and allowing passage of the image through the aperture the die;

the imaging lens integrated with a lens housing, the lens housing secured within the sensor housing, the imaging lens adapted to receive the image and focus the image on the die; and wherein the sensor housing is an insert molded lead frame.

* * * * *